US012737746B2

(12) United States Patent
Whytock et al.

(10) Patent No.: US 12,737,746 B2
(45) Date of Patent: Sep. 15, 2026

(54) SYSTEMS AND METHODS OF ENCRYPTING TRANSACTION DATA

(71) Applicant: NCR Voyix Corporation, Atlanta, GA (US)

(72) Inventors: Alexander William Whytock, Perthshire (GB); Conor Michael Fyfe, Carnoustie (GB)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/899,342

(22) Filed: Aug. 30, 2022

(65) Prior Publication Data

US 2024/0070640 A1 Feb. 29, 2024

(51) Int. Cl.

| | |
|---|---|
| ***G06Q 20/20*** | (2012.01) |
| ***G06Q 20/04*** | (2012.01) |
| ***G06Q 20/38*** | (2012.01) |
| ***G06Q 40/12*** | (2023.01) |

(52) U.S. Cl.

CPC ......... *G06Q 20/209* (2013.01); *G06Q 20/047* (2020.05); *G06Q 20/3829* (2013.01); *G06Q 40/123* (2013.12); *G06Q 2220/00* (2013.01)

(58) Field of Classification Search

CPC .. G06Q 20/209; G06Q 40/123; G06Q 20/047; G06Q 20/3829; G06Q 2220/00

See application file for complete search history.

(56) References Cited

U.S. PATENT DOCUMENTS

| | | | | |
|---|---|---|---|---|
| 6,516,996 B1 * | 2/2003 | Hippelainen | .......... | G06Q 20/04 705/40 |
| 6,839,843 B1 * | 1/2005 | Bacha | .................... | H04L 63/10 380/258 |
| 7,860,934 B1 * | 12/2010 | Wolfe | ................. | G06Q 20/102 709/224 |
| 9,626,663 B2 * | 4/2017 | Capel | .................... | G06Q 20/20 |
| 9,672,518 B2 * | 6/2017 | Sobel | .................. | G06Q 20/327 |
| 10,592,941 B2 * | 3/2020 | Maenpaa | ............... | G06Q 30/04 |
| 11,544,292 B1 * | 1/2023 | Timilsina | ........... | G06Q 10/1095 |
| 2005/0273440 A1 * | 12/2005 | Ching | ................... | G06Q 40/04 705/64 |
| 2006/0273163 A1 * | 12/2006 | Gusler | ................. | G06Q 20/047 235/383 |
| 2011/0093934 A1 * | 4/2011 | Le Saint | .............. | H04L 9/3234 726/5 |

(Continued)

OTHER PUBLICATIONS

Katherine T. Wadsworth, et al., An Innovation in Paper Receipts: The Electronic Receipt Management System, May 20, 2010, IEEE, pp. 88-93 (Year: 2010).*

*Primary Examiner* — Nilesh B Khatri

(74) *Attorney, Agent, or Firm* — Schwegman Lundberg & Woessner, P.A.

(57) ABSTRACT

Various embodiments herein relate data privacy, in particular systems and method of encrypting transaction data. One example method includes receiving, within processing of a transaction, an encryption data element from customer at a point-of-sale (POS) terminal and encrypting a digital receipt of the transaction with the encryption data element. This method then proceeds by storing the encrypted digital receipt to a network storage location from which the electronic receipt image is accessible, directly or indirectly, for later retrieval by the customer.

14 Claims, 4 Drawing Sheets

(56) References Cited

U.S. PATENT DOCUMENTS

| | | | | |
|---|---|---|---|---|
| 2011/0137802 | A1* | 6/2011 | Spies | G06Q 20/20 705/65 |
| 2014/0222545 | A1* | 8/2014 | Hajji | G06Q 20/20 705/16 |
| 2015/0142514 | A1* | 5/2015 | Tutte | G06Q 30/0202 705/7.29 |
| 2015/0180833 | A1* | 6/2015 | Snow | G06Q 10/10 713/155 |
| 2016/0019539 | A1* | 1/2016 | Hoyos | G06Q 20/327 705/75 |
| 2016/0104154 | A1* | 4/2016 | Milov | G06Q 20/401 705/67 |
| 2020/0104834 | A1* | 4/2020 | Pontious | G06Q 20/3674 |
| 2021/0049576 | A1* | 2/2021 | Anson | G06Q 20/209 |
| 2021/0182863 | A1* | 6/2021 | Doraiswamy | G06Q 20/0855 |
| 2021/0377013 | A1* | 12/2021 | Lee | H04L 9/3271 |
| 2022/0116231 | A1* | 4/2022 | Choi | H04L 9/3231 |
| 2022/0230145 | A1* | 7/2022 | Somal | G06Q 20/202 |
| 2022/0309494 | A1* | 9/2022 | Crintea | G06Q 20/3823 |
| 2022/0309511 | A1* | 9/2022 | Metnick | G06Q 20/401 |
| 2023/0064227 | A1* | 3/2023 | Prasad | G06Q 20/047 |
| 2024/0054457 | A1* | 2/2024 | Bharucha | G06Q 20/34 |
| 2025/0094985 | A1* | 3/2025 | Bricca | G06Q 20/047 |

* cited by examiner

SYSTEMS AND METHODS OF ENCRYPTING TRANSACTION DATA

BACKGROUND INFORMATION

Paper receipts are a burden on the environment, retailers, banks, and other receipt issuing entities in terms of replenishment costs. Digital receipts exist but with emerging privacy regulations and consumer concern, the ability to track or observe the consumer's transactions, is a concern and may eventually involve legal and regulatory burdens.

SUMMARY

Various embodiments herein relate data privacy, in particular systems and method of encrypting transaction data. One example method includes receiving, within processing of a transaction, an encryption data element from customer at a point-of-sale (POS) terminal and encrypting a digital receipt of the transaction with the encryption data element. This method then proceeds by storing the encrypted digital receipt to a network storage location from which the electronic receipt image is accessible, directly or indirectly, for later retrieval by the customer.

Another method embodiment includes receiving an encrypted digital receipt from a POS terminal via a network, the encrypted digital receipt decryptable only by one party to a transaction that the encrypted digital receipt memorializes. The method in some embodiments further includes storing the encrypted digital receipt. Subsequently the method may receive a request via the network for the encrypted digital receipt and proceed with transmitting the encrypted digital receipt to the requestor in the encrypted form via the network.

A further embodiment, in the form of a POS terminal includes a computer processor, an input device, a network interface device, and a memory storing instructions executable by the computer processor to cause the system to perform data processing activities. The data processing activities may include receiving, within processing of a transaction by the input device, an encryption data element from customer at the POS terminal and generating and encrypting a digital receipt of the transaction with the encryption data element. The data processing activities may further include storing the encrypted digital receipt to a network storage location, via the network interface device, from which the electronic receipt image is accessible, directly or indirectly, for later retrieval by the customer.

DETAILED DESCRIPTION

Paper receipts are a burden on the environment, retailers, banks, and other receipt issuing entities in terms of replenishment costs. Digital receipts exist but with emerging privacy regulations and consumer concern, the ability to track or observe the consumer's transactions, is a concern and may eventually involve legal and regulatory burdens. Therefore, the embodiments herein provide solutions to increase consumer confidence in digital receipts and increase consumer privacy. Some embodiments go even further to enable delegation of receipt access, such as to tax preparers, accounting software systems, and the like.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
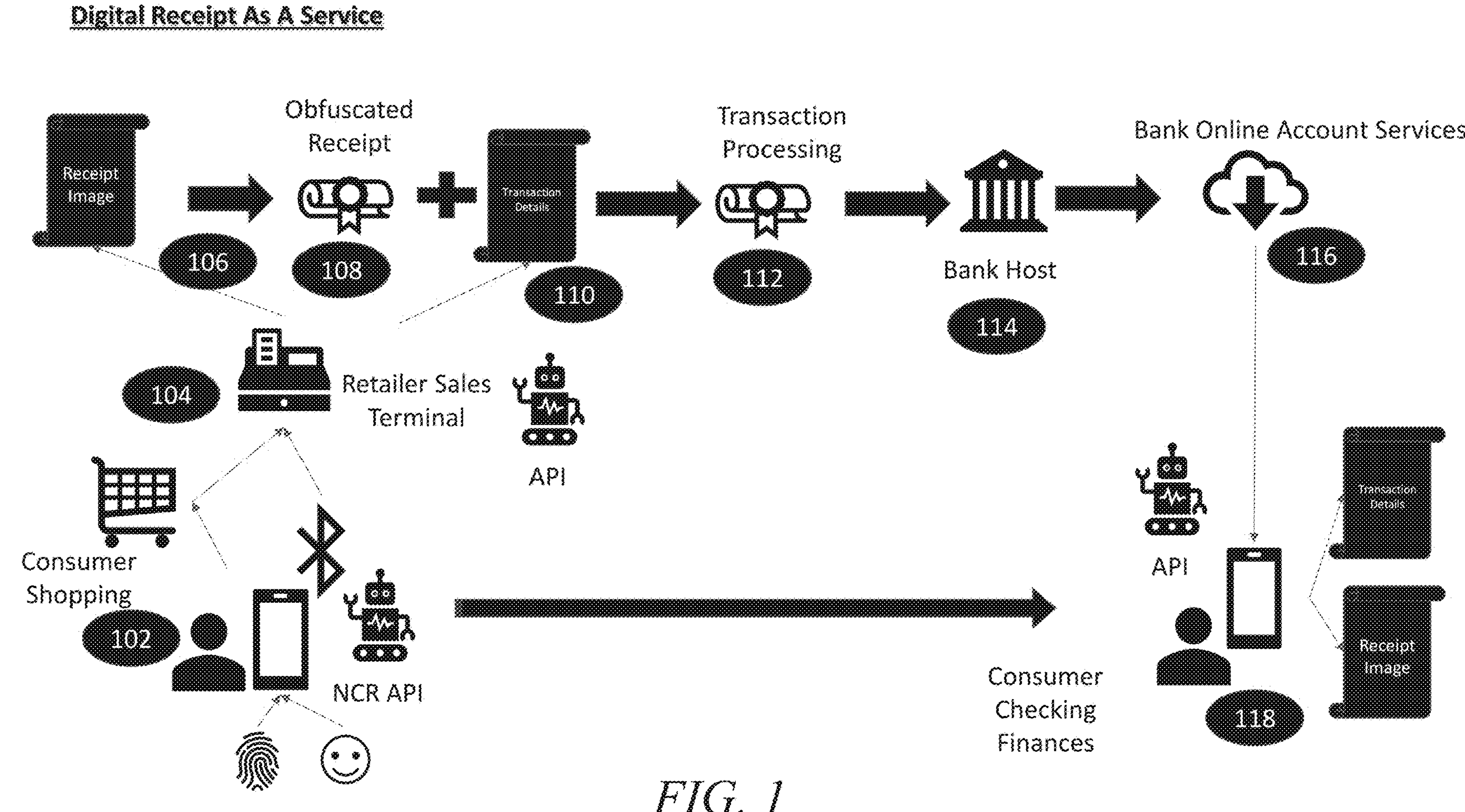
FIG. 1 is a block flow diagram of a method, according to an example embodiment.

FIG. 1 is a block flow diagram of a method, according to an example embodiment. This method provides a "Digital Receipt As A Service API" in which the consumer's receipt is encrypted and viewable on the consumer's online banking application. For example, a consumer 102 purchases goods at the retailer's point=of-sale or self-checkout 104. The illustrated "Digital Receipt As A Service" API of the method cryptographically obfuscates an image of the receipt 106 and embeds the obfuscated receipt 108 image within the transaction details 110. The transaction package 112 is processed as normal by the bank host 114, but the bank has unable to access or process the detailed data that may be included within the obfuscated receipt 108. Later, the consumer 102 accesses their account details using their online banking application 118. The "Digital Receipt As A Service" API for the online application or device app is utilized to recover the receipt 106.

The obfuscated receipt 108 is recovered by the consumer 102 entering the same one-time code or provides an encryption key allowing the consumer 102 to view their transaction details, in privacy. In other embodiments, the bank online account services may email the obfuscated receipt to the consumer's 102 device for viewing, again recovered by the one-time code, encryption key, or other encryption data item used to encrypt or decrypt the obfuscated receipt 108. Additionally, the embodiments described with regard to FIG. 1 and the other embodiments herein may be equally implemented with automated teller machines (ATMs) and other self-service kiosk terminals.

Figure 2:
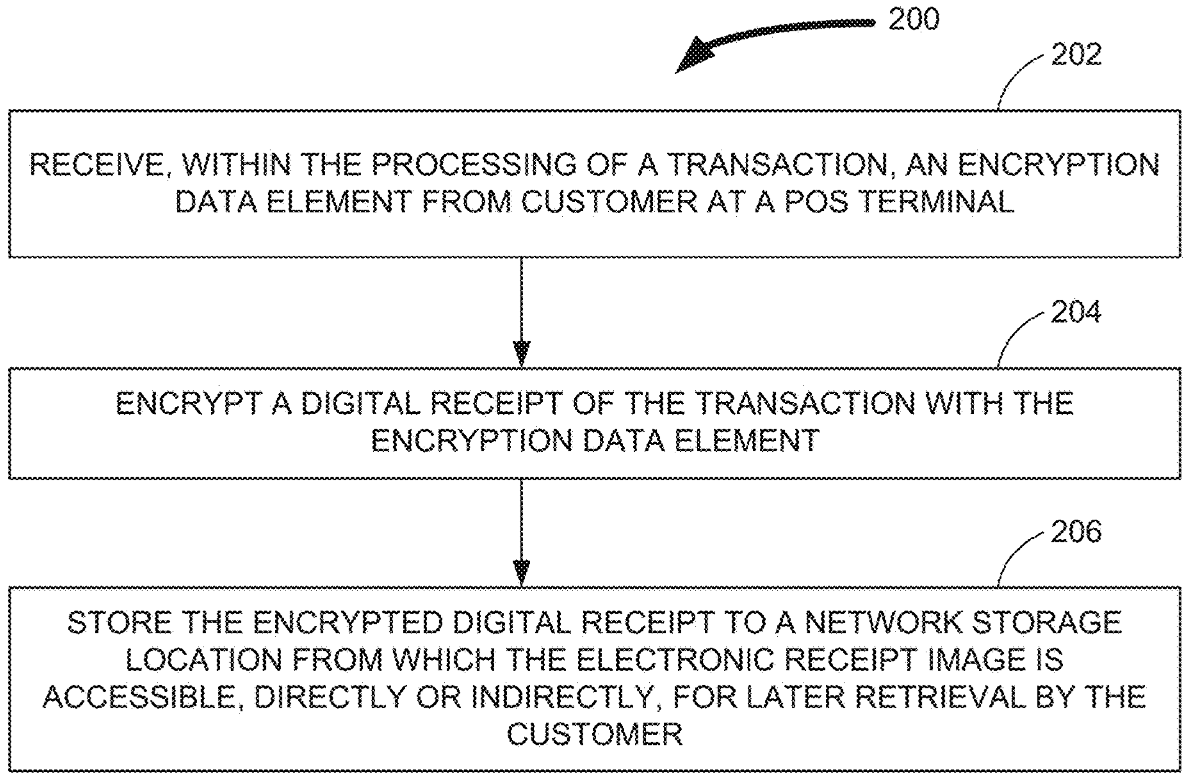
FIG. 2 is a block flow diagram of a method, according to an example embodiment.

FIG. 2 is a block flow diagram of a method 200, according to an example embodiment. The method 200 is an example of a method performed by or at a POS terminal to secure receipt data. The method 200 includes receiving 202, within processing of a transaction, an encryption data element from customer at a POS terminal, generating a digital receipt of a transaction, and encrypting 204 the digital receipt of the transaction with the encryption data element. The method 200 also includes storing 206 the encrypted digital receipt to a network storage location from which the electronic receipt image is accessible, directly or indirectly, for later retrieval by the customer. For example, the customer may access the receipt directly from an online banking account from a bank that stores the encrypted digital receipt. In other embodiments, the customer request for the encrypted digital receipt may be redirected to a service provider from which the receipt is retrievable, i.e., indirect access.

In some embodiments of the method 200, the encryption data element is an encryption key. For example, the encryption key may be a public key of a public/private key pair provided by the customer to the POS terminal, such as via a near field communication (NFC) technology, such as BLUETOOTH, from a mobile device. In other embodiments, a biometric measure, such as an actual or derivative of a finger print, iris scan, and the like, maybe received as an input used to encrypt 204 the digital receipt such that the same biometric measure may be measured and used to decrypt on the requesting side.

In some embodiments, storing 206 the encrypted electronic receipt to a network storage location includes transmitting the encrypted electronic receipt as part of transaction data stored by a transaction database that is in part accessible by the customer to retrieve at least the digital receipt.

In some embodiments, the digital receipt is a digital image file. In other embodiments, the digital receipt may be a dataset of receipt data.

In some embodiments of the method 200, storing 206 the encrypted digital receipt further includes storing the digital receipt for later retrieval by third-parties as delegated by the customer. Such third-parties may include one or more of an accountant, tax preparer, and services or software packages that provide the same.

In some such embodiments, the network location to which the encrypted digital receipt is stored is a digital receipt service provider storage location and the digital receipt is stored with a digital receipt identifier. Further, storing 206 a record of the transaction may include the digital receipt identifier to a transaction database. In some such embodiments, the customer can retrieve the digital receipt from the network location of digital receipt service provider with the digital receipt identifier when retrieved from the transaction database.

Figure 3:
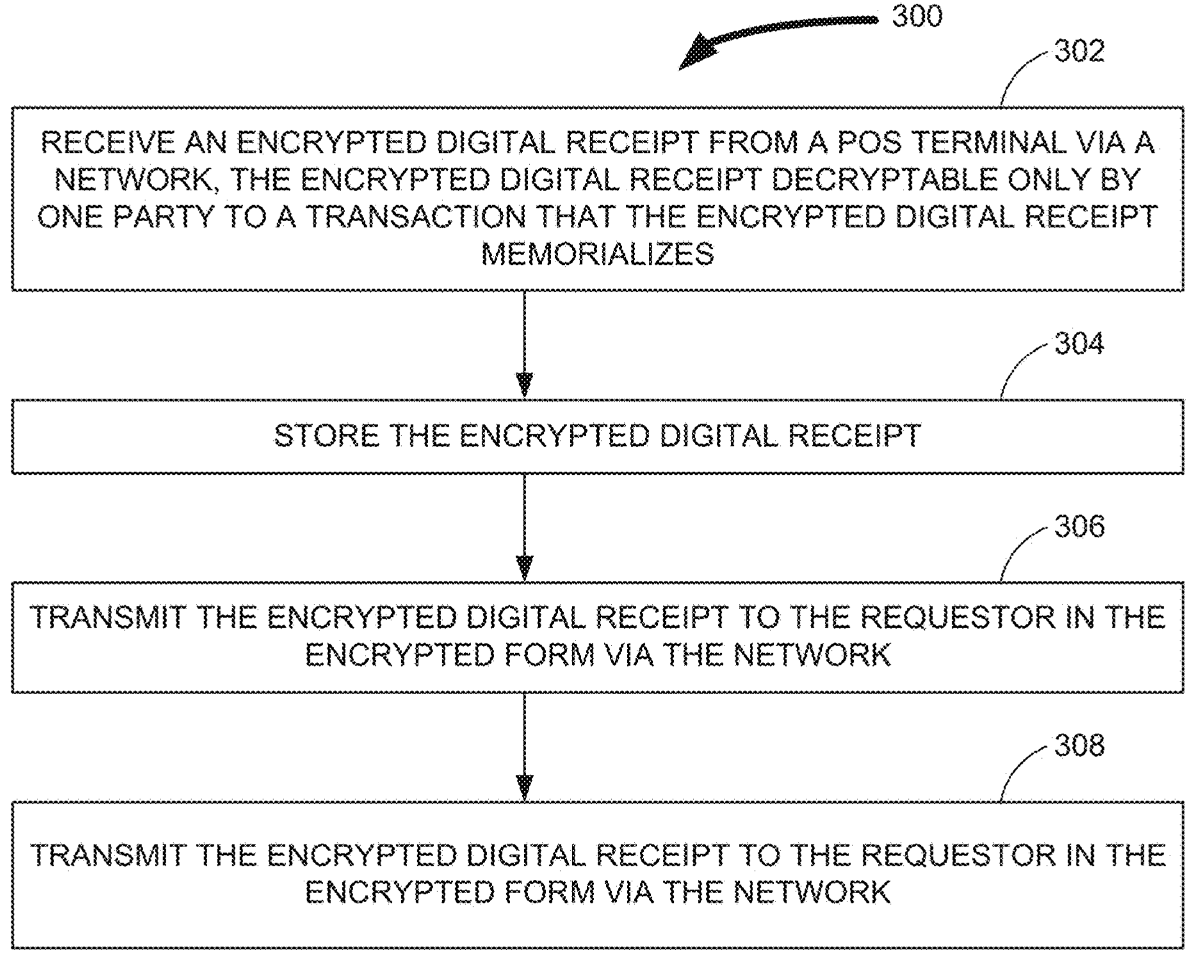
FIG. 3 is a block flow diagram of a method, according to an example embodiment.

FIG. 3 is a block flow diagram of a method, according to an example embodiment. The method 300 is an example of a method 300 that may be performed by an encrypted digital receipt storage hub, such as may be operated by a retailer issuing the receipt, a service provider providing digital receipt services, and the like.

The method 300 includes receiving 302 an encrypted digital receipt from a POS terminal via a network such that the encrypted digital receipt decryptable only by one party to a transaction that the encrypted digital receipt memorializes, or another in possession of a decryption key or delegated permission of a customer to decrypt the receipt with the appropriate key or other decryption mechanism, such as an accounting or tax software service. The method 300 further includes storing 304 the encrypted digital receipt.

Subsequently, the method 300 may receive 306 a request via the network for the encrypted digital receipt. If the request is adequate and in some embodiments as may be verified within an authenticated session, the method 300 may proceed with transmitting 308 the encrypted digital receipt to the requestor in the encrypted form via the network.

In some embodiments, the encrypted digital receipt is received 302 with transaction data in cleartext and both are stored in a transaction database.

Figure 4:
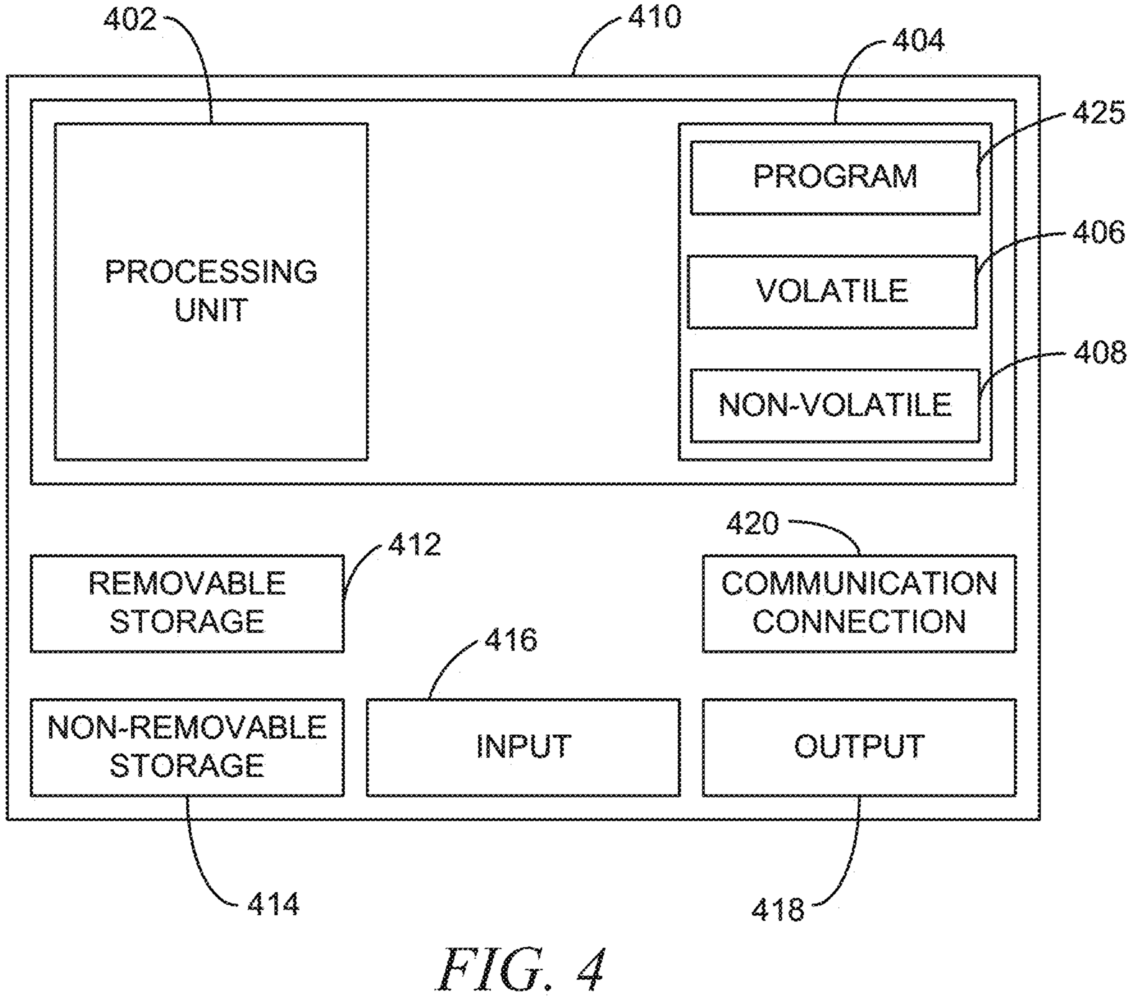
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices. For example, the communication connection 420 in some embodiments may be a BLUETOOTH® connection with a wireless headset that includes a speaker and a microphone. As such in these embodiments, a BLUETOOTH® transceiver device may be the audio output device as described elsewhere herein.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving, by a processor of a point-of-sale (POS) terminal and in association with processing of a transaction, an encryption data element comprising a public key of a public/private key pair provided by a customer to the POS terminal;

cryptographically obfuscating a digital receipt of the transaction by encrypting, by the processor, the digital receipt with the public key to obtain an encrypted digital receipt;

embedding the encrypted digital receipt within transaction details;

storing, by the processor, the encrypted digital receipt at a network storage location from which the digital receipt is accessible, directly or indirectly, for later retrieval by the customer;

associating an access control with the network storage location, to control access to the encrypted digital receipt, wherein access control is based on a validation of the public/private key pair;

transmitting the encrypted digital receipt embedded within the transaction details as a transaction package to a transaction database in association with transaction data for the transaction, wherein the transaction data is at least in part accessible by the customer;

retrieving the encrypted digital receipt;

receiving a private key of the public/private key pair from the customer;

determining that the private key corresponds to the public key;

responsive to determining that the private key corresponds to the public key, decrypting the encrypted digital receipt using the private key to obtain a decrypted digital receipt; and providing the decrypted digital receipt to an online banking application interface accessible to the customer.

2. The method of claim 1, wherein the digital receipt is a digital image file.

3. The method of claim 1, wherein storing the encrypted digital receipt comprises storing the digital receipt for later retrieval by a third party as delegated by the customer.

4. The method of claim 1, wherein: the network storage location to which the encrypted digital receipt is stored is a digital receipt service provider storage location and the digital receipt is stored with a digital receipt identifier; and storing a record of the transaction including the digital receipt identifier to the transaction database.

5. The method of claim 4, wherein the customer retrieves the digital receipt from the network storage location of the digital receipt service provider storage location with the digital receipt identifier from the transaction database.

6. The method of claim 1, wherein storing the encrypted digital receipt comprises authorizing access by at least one third party delegated by the customer to access the encrypted digital receipt from the network storage location.

7. A method comprising:

receiving, by a processor of a server, an encrypted digital receipt provided by point-of-sale (POS) terminal via a network;

wherein the encrypted digital receipt is decryptable by a particular party to a transaction associated with the encrypted digital receipt;

wherein the POS terminal encrypted a digital receipt using a biometric measure received as input;

wherein the POS terminal cryptographically obfuscated the digital receipt by encrypting the digital receipt using a public key of a public/private key pair provided by the particular party to the POS terminal during the transaction;

storing, by the processor, the encrypted digital receipt;

receiving, by the processor, a request via the network from a requestor for the encrypted digital receipt, wherein the request includes a private key of the public/private key pair provided by the requestor;

verifying that the private key of the requestor corresponds to the public key used to encrypt the digital receipt;

responsive to determining verifying that the private key of the requestor corresponds to the public key, transmitting, by the processor, the encrypted digital receipt to the requestor via the network;

associating, by the processor, an access control to the encrypted digital receipt based on the public/private key pair;

storing the encrypted digital receipt with transaction data in a cleartext format within a transaction database; and verifying the request is received within an authenticated session before transmitting the encrypted digital receipt to the requestor.

8. The method of claim 7, wherein receiving the encrypted digital receipt comprises receiving the encrypted digital receipt with the transaction data in the cleartext format.

9. The method of claim 7, wherein receiving the request comprises receiving the request from a third-party delegate of the particular party, wherein the third-party delegate is authorized by the particular party to decrypt the encrypted digital receipt upon presentation of a second biometric measure with the request.

10. The method of claim 9, wherein the third-party delegate is a software process.

11. The method of claim 7, wherein the biometric measure comprises an iris scan.

12. The method of claim 7, further comprising verifying the requestor based on presentation of the biometric measure.

13. A point-of-sale (POS) terminal comprising:

a computer processor;

an input device;

a network interface device; and a memory storing instructions executable by the computer processor to cause the POS terminal to perform data processing activities comprising:

receiving, within processing of a transaction being processed by the input device, a public key of a public/private key pair from a customer at the POS terminal via the input device;

using the public key as an encryption key to cryptographically obfuscate a digital receipt of the transaction;

encrypting the digital receipt of the transaction with the public key to obtain unique encryption key to obtain an encrypted digital receipt for the digital receipt of the transaction;

storing the encrypted digital receipt to a network storage location, via the network interface device;

associating an access control with the network storage location to control access to the encrypted digital receipt at the network storage location;

cryptographically obfuscating the encrypted digital receipt;

embedding the encrypted digital receipt within transaction details; and transmitting the encrypted digital receipt in association with transaction data for the transaction to a transaction database.

14. The POS terminal of claim 13, wherein storing the encrypted digital receipt comprises storing the digital receipt for later retrieval by one or more third parties as delegated by the customer when the customer authorizes and provides a biometric measure to the one or more third parties.

* * * * *